US010609307B2

(12) United States Patent
Adsumilli et al.

(10) Patent No.: US 10,609,307 B2
(45) Date of Patent: Mar. 31, 2020

(54) AUTOMATIC COMPOSITION OF COMPOSITE IMAGES OR VIDEOS FROM FRAMES CAPTURED WITH MOVING CAMERA

(71) Applicant: GoPro, Inc., San Mateo, CA (US)

(72) Inventors: Balineedu Chowdary Adsumilli, San Mateo, CA (US); Ryan Lustig, Encinitas, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/080,299

(22) Filed: Mar. 24, 2016

(65) Prior Publication Data

US 2017/0094195 A1    Mar. 30, 2017

Related U.S. Application Data

(60) Provisional application No. 62/233,882, filed on Sep. 28, 2015.

(51) Int. Cl.
*H04N 5/272* (2006.01)
*G06T 15/50* (2011.01)
(Continued)

(52) U.S. Cl.
CPC ............ *H04N 5/272* (2013.01); *G06T 5/002* (2013.01); *G06T 7/11* (2017.01); *G06T 7/143* (2017.01); *G06T 7/174* (2017.01); *G06T 7/194* (2017.01); *G06T 7/20* (2013.01); *G06T 7/254* (2017.01); *G06T 11/60* (2013.01); *G06T 15/503* (2013.01); *H04N 5/2356* (2013.01); *H04N 13/128* (2018.05); *G06T 2207/10016* (2013.01);
(Continued)

(58) Field of Classification Search
CPC ..................................................... H04N 5/272
See application file for complete search history.

(56) References Cited

U.S. PATENT DOCUMENTS 4,179,704 A * 12/1979 Moore ................. H04N 5/2625
348/579
6,504,569 B1 * 1/2003 Jasinschi ................. G06T 7/579
345/950
(Continued)

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.
(Continued)

*Primary Examiner* — Jefferey F Harold
*Assistant Examiner* — Humam M Satti
(74) *Attorney, Agent, or Firm* — Gazdzinski & Associates, PC

(57) ABSTRACT

A processing device generates composite images from a sequence of images. The composite images may be used as frames of video. A foreground/background segmentation is performed at selected frames to extract a plurality of foreground object images depicting a foreground object at different locations as it moves across a scene. The foreground object images are stored to a foreground object list. The foreground object images in the foreground object list are overlaid onto subsequent video frames that follow the respective frames from which they were extracted, thereby generating a composite video.

24 Claims, 12 Drawing Sheets

(51) Int. Cl.

| | | |
|---|---|---|
| *H04N 13/128* | (2018.01) | |
| *G06T 11/60* | (2006.01) | |
| *G06T 7/11* | (2017.01) | |
| *G06T 7/143* | (2017.01) | |
| *G06T 7/194* | (2017.01) | |
| *G06T 7/174* | (2017.01) | |
| *G06T 7/254* | (2017.01) | |
| *G06T 5/00* | (2006.01) | |
| *G06T 7/20* | (2017.01) | |
| *H04N 5/235* | (2006.01) | |
| *H04N 13/00* | (2018.01) | |

(52) U.S. Cl.
CPC ............... *G06T 2207/10021* (2013.01); *G06T 2207/20036* (2013.01); *H04N 2013/0085* (2013.01); *H04N 2013/0092* (2013.01)

(56) References Cited

U.S. PATENT DOCUMENTS

| | | |
|---|---|---|
| 6,611,607 B1 | 8/2003 | Davis et al. |
| 6,728,317 B1 | 4/2004 | Demos |
| 6,996,244 B1 | 2/2006 | Slaney et al. |
| 7,750,904 B2 | 7/2010 | Jojic et al. |
| 8,290,253 B1 | 10/2012 | Wang et al. |
| 8,606,073 B2 | 12/2013 | Woodman |
| 9,171,577 B1 | 10/2015 | Newman et al. |
| 9,396,588 B1 | 7/2016 | Li |
| 9,547,908 B1 | 1/2017 | Kim et al. |
| 9,575,803 B2 | 2/2017 | Chauvet et al. |
| 9,894,298 B1* | 2/2018 | Solh .................. H04N 5/23293 |
| 2003/0007567 A1 | 1/2003 | Newman et al. |
| 2003/0147547 A1 | 8/2003 | Lin et al. |
| 2004/0017504 A1 | 1/2004 | Prandoni et al. |
| 2004/0028287 A1* | 2/2004 | Kondo ................... H04N 19/51 |
| | | 382/275 |
| 2004/0034781 A1 | 2/2004 | Natarajan |
| 2004/0131229 A1 | 7/2004 | Acharya et al. |
| 2005/0117805 A1 | 6/2005 | Poutet et al. |
| 2006/0071825 A1 | 4/2006 | Demos |
| 2006/0251289 A1 | 11/2006 | Williams et al. |
| 2007/0110298 A1 | 5/2007 | Graepel et al. |
| 2008/0170626 A1 | 7/2008 | Sung et al. |
| 2008/0180439 A1 | 7/2008 | Adabala et al. |
| 2008/0270569 A1* | 10/2008 | McBride ............ G06K 9/00771 |
| | | 709/217 |
| 2008/0276089 A1 | 11/2008 | Tian |
| 2009/0132371 A1 | 5/2009 | Strietzel et al. |
| 2009/0153730 A1* | 6/2009 | Knee ..................... G06T 3/0012 |
| | | 348/445 |
| 2009/0324191 A1* | 12/2009 | Reusens ................ G06T 15/50 |
| | | 386/353 |
| 2010/0177977 A1 | 7/2010 | Seshadri et al. |
| 2010/0208987 A1 | 8/2010 | Chang |
| 2010/0266157 A1 | 10/2010 | Shin et al. |
| 2011/0007185 A1 | 1/2011 | Yonaha |
| 2011/0286625 A1 | 11/2011 | Petrovic et al. |
| 2012/0002112 A1* | 1/2012 | Huang ................... H04N 5/144 |
| | | 348/579 |
| 2012/0045090 A1 | 2/2012 | Bobbitt |
| 2012/0063670 A1 | 3/2012 | Woo |
| 2012/0170805 A1 | 7/2012 | Brown et al. |
| 2012/0242853 A1* | 9/2012 | Jasinski ............. H04N 5/23232 |
| | | 348/222.1 |
| 2012/0281871 A1 | 11/2012 | Reed et al. |
| 2013/0094780 A1 | 4/2013 | Tang |
| 2013/0314442 A1 | 11/2013 | Langlotz et al. |
| 2014/0022394 A1 | 1/2014 | Bae et al. |
| 2014/0050454 A1 | 2/2014 | Slotte |
| 2014/0063061 A1 | 3/2014 | Reitan |
| 2014/0267801 A1* | 9/2014 | Grundmann ......... H04N 5/2329 |
| | | 348/208.1 |
| 2014/0369558 A1 | 12/2014 | Holz |
| 2015/0235378 A1* | 8/2015 | Rhee ..................... G06T 19/006 |
| | | 345/633 |
| 2015/0310297 A1 | 10/2015 | Li |
| 2015/0371447 A1 | 12/2015 | Yasutake |
| 2016/0028968 A1* | 1/2016 | Affaticati ............. H04N 5/2723 |
| | | 348/47 |
| 2016/0057363 A1 | 2/2016 | Posa |
| 2016/0080830 A1 | 3/2016 | Kim et al. |
| 2016/0125633 A1 | 5/2016 | Windmark et al. |
| 2016/0205341 A1 | 7/2016 | Hollander et al. |
| 2016/0274338 A1 | 9/2016 | Davies et al. |
| 2016/0358628 A1* | 12/2016 | Liu ....................... G11B 27/031 |
| 2016/0366396 A1* | 12/2016 | Kim .......................... G06T 7/70 |

OTHER PUBLICATIONS

Adsumilli C., "A dissertation submitted in partial satisfaction of the requirements for the degree of Doctor of Philosophy in Electrical and Computer Enqineerinq", Sep. 2005, 193 paqes.

Adsumilli C. et al., "A Dynamically Adaptive Constrained Unequal Error Protection Scheme for Video Transmission over Wireless Channels", Proceedinqs IEEE International Workshop on Multimedia Signal Processing, 2002, pp. 41-44, Virgin Islands, USA.

Adsumilli C. et al., "A Hybrid Constrained Unequal Error Protection and Data Hiding Scheme for Packet Video Transmission", Proceedings IEEE International Conference on Acoustics, Speech, and Signal Processing (ICASSP), Apr. 2003, pp. V680-V683, Hong Kong.

Adsumilli C. et al., A Noise Based Quantization Model for Restoring Block Transform Compressed Images:, Proceedings of the IAST£0 International Conference Signal and Image Processing, Aug. 13-16, 2001, pp. 354-359, Honolulu, Hawaii, USA.

Adsumilli C. et al., "A Robust Error Concealment Technique Using Data Hiding for Image and Video Transmission Over Lossy Channels", IEEE Transactions on Circuits and Systems for Video Technology, Nov. 2005, pp. 1394-1406, vol. 15(11).

Adsumilli C. et al., "Adapive Wireless Video Communications: Challenges and Approaches", Proceedings of International Workshop on Packet Video, Apr. 2002, pp. 1-11, Pittsburgh, Pennsylvania, USA.

Adsumilli C. et al., "Detector Performance Analysis of Watermark-Based Error Concealment in Image Communications", Proceedings IEEE International Conference on Image Processing, 2005, pp. 916-919, vol. 3.

Adsumilli C. et al., "Error Concealment in Video Communications by Informed Watermarking", PSIVT, 2006, pp. 1094-1102.

Adsumilli C. et al., "Error Concealment in Video Communications Using DPCM Bit Stream Embedding", Proceedings IEEE International Conference on Acoustics, Speech and Signal Processing (ICASSP), Apr. 2005, pp. 11-169-11-172, Philadelphia, USA.

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Baker, et al., "A Database and Evaluation Methodology for Optical Flow" International Journal of Computer Vision 92.1 (2011): 1-31.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Boucherkha, S., et al., "A Lossless Watermarking Based Authentication System for Medical Images", Would Academy of Science, Engineering and Technology, International Journal of Medical, Health, Biomedical, Bioengineering and Pharmaceutical Engineering, 2007, vol. 1, No. 1, pp. 20-23.

(56) References Cited

OTHER PUBLICATIONS

Brainard R.C., et al., "Low-Resolution TV: Subjective Effects of Frame Repetition and Picture Replenishment," Bell Labs Technical Journal, Jan. 1967, vol. 46 (1), pp. 261-271.
Brox, et al., "High Accuracy Optical Flow Estimation Based on a Theory for Warping", European Conference on Computer Vision, Springer-Verlag Berlin Heidelberg, 2004.
Burt et al., "A Multiresolution Spline with Application to Image Mosaics," in ACM Transactions on Graphics (TOG), 1983, vol. 2, No. 4, pp. 217-236.
Carli M. et al., "Video Watermarking in 30 OCT Domain", Proceedings of International Workshop on Spectral Methods and Multirate Signal Processing, Jun. 2005, pp. 141-144, Riga, Lavia, (Invited Paper).
Cavallaro, et al., "Object-based video: extraction tools, evaluation metrics and applications", Visual Communicati0ns and Image Processing; Jul. 8, 2003-Jul. 11, 2003, Lugano Switzerland, XP030080620.
Chan et al., "Active contours without edges". IEEE Transactions on Image Processing, 2001, 10 (2), pp. 266-277 (hereinafter "Chan").
Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Davis, et al., "The Visual Microphone: Passive Recovery of Sound from Video" (2014).
Didyk, et al., "Joint View Expansion and Filtering for Automultiscopic 3D Displays", ACM Transactions on Graphics (TOG) 32.6 (2013): 221.
Elen, "Whatever happened to Ambisonics" AudioMedia Magazine, Nov. 1991.
Freeman, et al., "Shape-Time Photography" IEEE Computer Society Conference on Computer Vision and Pattern Recognition, vol. 2. IEEE, 2003.
Fridrich, J., et al., "Lossless Data Embedding—New Paradigm in Digital Watermarking", EURASIP Journal on Applied Signal Processing, Oct. 29, 2001, pp. 185-196.
Gracias, et al., "Fast Image Blending Using Watersheds and Graph Cuts," Image and Vision Computing, 2009, vol. 27 (5), pp. 597-607.
H.264 (Jan. 2012) and/or ISO/IEC 14496⌊10:2012, Information technology ⌊ Coding of audio⌊visual objects ⌊ Part 10: Advanced Video Coding.
H.265 (Dec. 2016) also known as High Efficiency Video Code (HVEC),(described in e.g., ITU⌊T Study Group 16—Video Coding Experts Group (VCEG)—ITU⌊T H.265, and/or ISO/IEC JTC 1/SC 29/WG 11 Motion Picture Experts Group (MPEG)—the HEVC standard ISO/IEC 23008⌊2:2015.
Haouzia et al., "Methods for Image Authentication: A Survey," Multimedia Tools Appl, 2008, 46 pages.
Herbst E., et al., "Occlusion Reasoning for Temporal Interpolation Using Optical Flow," Department of Computer Science and Engineering, University of Washington, Tech. Rep. UW-CSE-09-08-01, 2009.
Huang, et al., "Maximum a Posteriori Probability Estimation for Online Surveillance Video Synopsis", IEEE Transactions on Circuits and Systems for Video Technology, IEEE Service Center, Piscataway, NJ, US, vol. 24, No. 8, Aug. 1, 2014 (Aug. 1, 2014), pp. 1417-1429.
Jakubowski M., et al., "Block-based motion estimation algorithms—a survey," Opto-Electronics Review 21, No. 1 (2013), pp. 86-102.
Kaur, M., et al., "A Review on Digital Watermarkign Using LSB", International Journal of Advanced Research in Computer Science and Software Engineering, Nov. 2005, vol. 5, Issue 11, pp. 1210-1214.
Kendall A., et al., "Bayesian Segnet: Model Uncertainty in Deep Convolutional Encoder-Decoder Architectures for Scene Understanding," arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-I 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schnyder, et al., "Depth image based compositing for stereo 3D", 3DTV-Conference: The True Vision—Capture, Transmission and Display of 3D Video (3DTV-Con), 2012, IEEE, Oct. 15, 2012, pp. 1-4.
Schnyder L., et al., "2D to 3D Conversion of Sports Content using Panoramas," Image Processing (ICIP), 2011, IEEE, pp. 1961-1964.
Schwartz, E., et al., "Implementation of Compression with Reversible Embedded Wavelets," In Proc. SPIE, 1995, 12 pages.
Shannon, " A Mathematical Theory of Communication", Bell Syst. Tech. J., 27:379-423, 623-656, 1948.
Suzuki et al., "Inter Frame Coding with Template Matching Averaging," in IEEE International Conference on Image Processing Proceedings (2007), vol. (III), pp. 409-412.
Szeliski, et al., "Fast Poisson blending using Multi-Splines." Computational Photography (ICCP), 2011 IEEE International Conference.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Tonci F. et al., "Buffer Constraints for Rate-Distortion Optimization in Mobile Video Communications", Proceedings of International Symph on Signals, Circuits and Systems, Jul. 2005, pp. 71-74, Lasi, Romania (Invited Paper).
Vass, J., et al., "Efficient Three-Dimensional Wavelet Codecs for Networked Video Communication," in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80.
Weinzaepfel, et al., "Deepflow: Large displacement optical flow with deep matching", Proceedings of the IEEE International Conference on Computer Vision, 2013.
Xiao, et al., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

Original Image
551

$I_{fgd}$
553

$I_{hull}$
555

$I_{noisyhull}$
559

$I_{cleanfgd}$
561

AUTOMATIC COMPOSITION OF COMPOSITE IMAGES OR VIDEOS FROM FRAMES CAPTURED WITH MOVING CAMERA

RELATED APPLICATIONS

This application claims the benefit of priority to U.S. Provisional Application No. 62/233,882 filed on Sep. 28, 2015 and entitled "AUTOMATIC COMPOSITION OF COMPOSITE IMAGES AND VIDEOS FROM A SINGLE VIDEO OR IMAGE SEQUENCE", the content of which is incorporated herein by reference in its entirety.

BACKGROUND

Technical Field

This disclosure relates to video or image processing, and more specifically, to automatically generating composite images and videos from a single video or image sequence.

Description of the Related Art

A composite image is formed by superimposing components of two or more separate images or image segments into a single image. For example, when an object moves across a background scene, a composite image may show snapshots of the object at various time points in its motion overlaid over the background scene. Composite images therefore provide an informative and interesting depiction of an object's path in a single image.

Composite images may also be used as individual frames of video to show, for example, a trail of an object being generated as the object moves across a scene. However, conventional techniques for generating composite video frames are computationally inefficient and produce videos with undesirable visual artifacts.

SUMMARY

In one aspect of the present disclosure, a method for generating a composite output image from an input video having a sequence of frames is disclosed. In one embodiment, the method includes: receiving a sequence of image frames depicting a foreground object, the sequence of image frames captured by a camera experiencing motion; for selected frames in the sequence of image frames, performing by a processing device, foreground/background segmentations to extract respective foreground object images each including a representation of the foreground object with background pixels subtracted and storing the respective foreground object images to a foreground object list; determining, for each of the respective foreground object images in the foreground object list, a respective motion between (i) a position of the camera at which a selected frame corresponding to a respective foreground object image was captured and (ii) a position of the camera capturing a current frame of the respective foreground object image; transforming the representation of foreground objects in the respective foreground object images based on the respective motion to generate transformed foreground object images; and overlaying the transformed foreground object images onto the current frame to generate a composite output image.

In one variant, the transforming of the representation includes: translating a location of the representation of the foreground object in the respective foreground object images based on a component of the motion, the component of the motion representing a change in planar position of the camera between capturing the selected frame and capturing the current frame.

In another variant, the transforming of the representation further includes translating the location according to a motion equal and opposite to the component of the motion representing the change in planar position of the camera between capturing the selected frame and capturing the current frame.

In yet another variant, the transforming of the representation includes: translating a location of the representation of the foreground object in the foreground object image based on a component of the motion, the component of the motion representing a change in rotational position of the camera about a reference point between capturing the selected frame and capturing the current frame.

In yet another variant, the transforming of the representation further includes translating the location according to a motion equal and opposite to the component of the motion representing the change in rotational position of the camera between capturing the selected frame and capturing the current frame.

In yet another variant, the transforming of the representation includes: scaling the representation of the foreground object in the foreground object image based on a component of the motion, the component of the motion representing a change in depth of the camera relative to a reference plane between capturing the selected frame and capturing the current frame.

In yet another variant, the transforming of the representation further includes: enlarging the representation of the foreground object in the foreground object image in response to the camera being closer to a position of the foreground object when the selected frame was captured; and reducing in size the representation of the foreground object in the foreground object image in response to the camera being further from the position of the foreground object when the selected frame was captured.

In yet another variant, the transforming of the representation includes: translating the representation of the foreground object in the foreground object image based on a component of the motion, the component of the motion representing a change in pointing orientation of the camera between the current frame and the selected frame.

In yet another variant, the transforming of the representation further includes: applying a lens distortion effect to the representation of the foreground object based on the component of the motion representing the change in pointing orientation of the camera between the current frame and the selected frame.

In yet another variant, the method further includes: detecting an overlaid foreground object image exceeding an overlap threshold of at least one other overlaid foreground object image; and applying a partial transparency to the detected overlaid foreground object image exceeding the overlap threshold.

In yet another variant, the determining of the respective motion includes: identifying features in the selected frame corresponding to the respective foreground object image, and identifying corresponding features in the current frame; performing a correlation to determine estimated motions between the identified features in the selected frame and the corresponding features in the current frame; and determining the respective motion of the camera based on the estimated motions between the identified features in the selected frame and the corresponding features in the current frame.

In yet another variant, the determining of the respective motion includes: obtaining motion sensor data from one or more motion sensors of the camera; and determining the respective motion of the camera based on the motion sensor data.

In another aspect of the present disclosure, a non-transitory computer-readable storage medium is disclosed. In one embodiment, the storage medium stores instructions for generating a composite output video from an input video having a sequence of frames, the instructions when executed by a processor apparatus causing the processor to perform steps including: receiving a sequence of image frames depicting a foreground object, the sequence of image frames captured by a camera experiencing motion; for selected frames in the sequence of image frames, performing foreground/background segmentations to extract respective foreground object images each including a representation of the foreground object with background pixels subtracted and storing the respective foreground object images to a foreground object list; determining, for each of the respective foreground object images in the foreground object list, a respective motion of the camera between a position of the camera when the selected frame corresponding to the respective foreground object image was captured and a position of the camera when a current frame corresponding to the respective foreground object image was captured; transforming the representations of foreground objects in the foreground object images based on the respective motions to generate transformed foreground object images; and overlaying the transformed foreground object images onto the current frame to generate a composite output image.

In one variant, the transforming of the representation includes: translating a location of the representation of the foreground object in the respective foreground object images based on a component of the motion representing a change in planar position of the camera between capturing the selected frame and capturing the current frame.

In another variant, the transforming of the representation further includes translating the location according to a motion equal and opposite to the component of the motion representing the change in planar position of the camera between capturing the selected frame and capturing the current frame.

In yet another variant, the transforming of the representation includes: translating a location of the representation of the foreground object in the foreground object image based on a component of the motion representing a change in rotational position of the camera about a reference point between capturing the selected frame and capturing the current frame.

In yet another variant, the transforming of the representation further includes translating the location according to a motion equal and opposite to the component of the motion representing the change in rotational position of the camera between capturing the selected frame and capturing the current frame.

In yet another variant, the transforming of the representation includes: scaling the representation of the foreground object in the foreground object image based on a component of the motion representing a change in depth of the camera relative to a reference plane between capturing the selected frame and capturing the current frame.

In yet another variant, the transforming of the representation further includes: enlarging the representation of the foreground object in the foreground object image in response to the camera being closer to a position of the foreground object when the selected frame was captured; and reducing in size the representation of the foreground object in the foreground object image in response to the camera being further from the position of the foreground object when the selected frame was captured.

In yet another variant, the transforming of the representation includes: translating the representation of the foreground object in the foreground object image based on a component of the motion representing a change in pointing orientation of the camera between the current frame and the selected frame.

In yet another variant, the transforming of the representation further includes: applying a lens distortion effect to the representation of the foreground object based on the component of the motion representing the change in pointing orientation of the camera between the current frame and the selected frame.

In yet another variant, the instructions when executed by the processor apparatus further cause the processor to perform steps including: detecting an overlaid foreground object image exceeding an overlap threshold of at least one other overlaid foreground object image; and applying a partial transparency to the detected overlaid foreground object image exceeding the overlap threshold.

In yet another variant, the determining of the respective motion of the camera includes: identifying features in the selected frame corresponding to the respective foreground object image, and identifying corresponding features in the current frame; performing a correlation to determine estimated motions between the identified features in the selected frame and the corresponding features in the current frame; and determining the respective motion of the camera based on the estimated motions between the identified features in the selected frame and the corresponding features in the current frame.

In yet another variant, the determining of the respective motion of the camera includes: obtaining motion sensor data from one or more motion sensors of the camera; and determining the respective motion of the camera based on the motion sensor data.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
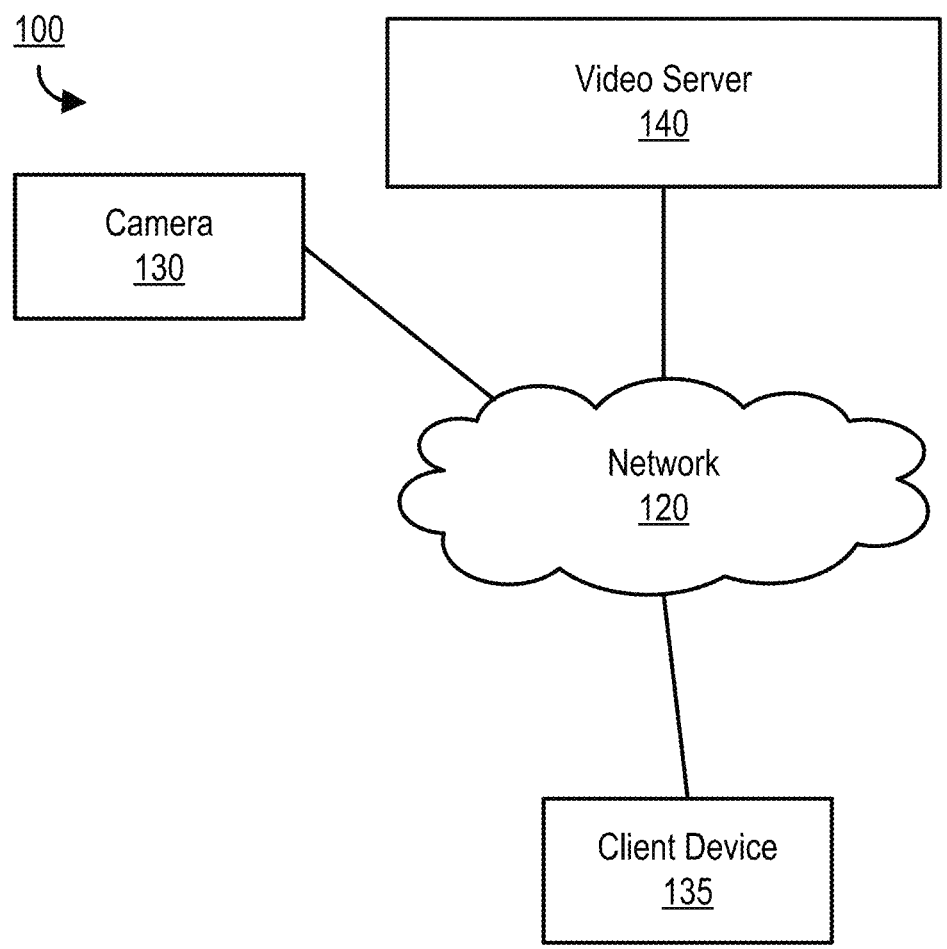
FIG. 1 illustrates an example embodiment of a media processing system.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In a first embodiment a composite output video is generated from an input video having a sequence of frames. A current video frame is received for processing from the sequence of frames and a processing device determines whether the current video frame meets first criteria. Responsive to the current video frame meeting the first criteria, the processing device performs a foreground/background segmentation based on a predictive model to extract a foreground object image from the current video frame. Here, the foreground object image comprises a representation of a foreground object depicted in the current video frame with background pixels subtracted. The foreground object image is stored to a foreground object list that stores a plurality of previously extracted foreground object images. Each of the foreground object images in the foreground object list are overlaid onto the current video frame to generate a composite video frame. Beneficially, the foreground/background segmentation can be performed only at frames from which the foreground object images are extracted and need not be performed at every frame. Furthermore, background motion in the output video is preserved.

In a second embodiment, a foreground object list comprising a plurality of previously extracted foreground object images is stored, in which each of the foreground object images comprising a representation of a foreground object with background pixels subtracted. A current video frame is received for processing from the sequence of frames and a foreground/background segmentation is performed based on a predictive model to extract a foreground object image for the current video frame. A processing device determines if the foreground object image meets first predefined criteria. Responsive to the foreground object image meeting the first predefined criteria, the foreground object image for the current frame is stored to the foreground object list. Each of the foreground object images in the foreground object list is then overlaid onto the current video frame to generate a composite video frame.

In a third embodiment, a range of frames is selected for processing from the sequence of frames and a foreground/background segmentation is performed on each of the frames in the range of frames to extract a plurality of candidate foreground object images based on a predictive model. The candidate foreground object images each comprise a representation of a foreground object depicted in a corresponding video frame with background pixels subtracted. Based on an image metric, a selected foreground object image is selected from the plurality of candidate foreground object images. The selected foreground object image is stored to a foreground object list. The foreground object images in the foreground object list are then overlaid on a current video frame to generate a composite video frame.

In a fourth embodiment, a sequence of image frames depicting a foreground object are received where the sequence of image frames are captured by a camera experiencing motion. For selected frames in the sequence of image frames, foreground/background segmentations are performed to extract respective foreground object images each comprising a representation of the foreground object with background pixels subtracted. The respective foreground object images are stored to a foreground object list. A respective motion of the camera is determined for each of the respective foreground object images in the foreground object list between the camera capturing the selected frame corresponding to the respective foreground object image and the camera capturing a current frame. The representations of the foreground objects in the foreground object images are transformed based on the respective motions to generate transformed foreground object images. The transformed foreground object images are overlaid onto the current frame to generate a composite output image.

In a fifth embodiment, a sequence of stereo video frames depicting a foreground object is received. For selected frames in the sequence of stereo video frames, foreground/background segmentations are performed to extract respective stereo foreground object images each comprising a representation of the foreground object with background pixels subtracted. The respective stereo foreground object images are stored to a foreground object list with each of the stereo foreground object images having left and right images with a disparity between them. The stereo foreground object images are transformed to adjust the respective disparities between the respective left and right images based on a change between a convergence depth for the respective selected frames and a convergence depth for the current frame. The transformed stereo foreground object images are overlaid onto the current frame to generate a composite output image.

Media Processing System

FIG. 1 is a block diagram of a media content system 100, according to one embodiment. The media content system 100 includes a network 120, a camera 130, a client device 135 and a video server 140. In alternative configurations, different and/or additional components may be included in the media content system 100.

The camera 130 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 130 is capable of capturing spherical or substantially spherical content. In other embodiments, the camera 130 may capture images or video having a non-spherical wide angle field of view or a standard field of view.

The video server 140 receives and stores videos and/or images captured by the camera 130. Furthermore, in one embodiment, the video server 140 provides the user with an interface, such as a web page or native application installed on the client device 135, to interact with and/or edit the stored videos and to generate output videos relevant to a particular user from one or more stored videos. The videos stored by the video server 140 may include traditional videos having, for example, 30 frames per second or 60 frames per second, or videos formed from a sequence of burst-captured images or time-lapsed images.

In a burst mode, for example, the camera 130 may capture a given number of frames (burst of photos) over a given time window. In some implementations, number of photos per burst may be configured by the user, e.g., between 1 and 1000. In some implementations, the time window duration may be user selected (e.g., between 0.1 s and 10 s) or dynamically configured by the camera given user preferences (e.g., inter-shot duration), detected user activity (e.g., sky diving, surfing, biking), available storage, image resolution, bracketing configuration (e.g., 3 exposures per shot), and/or other settings. By way of an illustration, a skateboarder, attempting to record a jump, may configure the camera to collect a burst of 30 frames within 1 s time window.

When operating in a time lapse mode, the camera 130 may be configured to capture one or more images at a given interval. The capture may commence based on an indication by the user (e.g., press of the record button, voice command, camera shake, clap, and/or other indication). In some implementations, the time lapse image acquisition may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition). The time lapse photo acquisition interval may be configured, for example, between 0.1 s and 120 s. In some implementations of time lapse photo acquisition, the camera 130 may be configured to take a single image (photo) at the specified interval or a plurality of images (e.g., 2-100). Multiple images may be utilized, e.g., when bracketing for exposure and/or focus distance. Duration of the time lapse may be configured by the user.

A user can interact with interfaces provided by the video server 140 via the client device 235 in order to edit or view the videos and images. The client device 135 is any computing device capable of receiving user inputs as well as transmitting and/or receiving data via the network 120. In one embodiment, the client device 135 is a conventional computer system, such as a desktop or a laptop computer. Alternatively, the client device 135 may be a device having computer functionality, such as a personal digital assistant (PDA), a mobile telephone, a smartphone or another suitable device. The user can use the client device 135 to view and interact with or edit videos stored on the video server 140. For example, the user can view web pages including video summaries for a set of videos captured by the camera 130 via a web browser on the client device 135. Alternatively, the editing and viewing interfaces described herein may execute locally on the client device 135 without necessarily requiring the video server 140.

One or more input devices associated with the client device 135 receive input from the user. For example, the client device 135 can include a touch-sensitive display, a keyboard, a trackpad, a mouse, a voice recognition system, and the like. In some embodiments, the client device 135 can access video from the camera 130, and can transfer the accessed video to the video server 140. While FIG. 1 shows a single client device 135, in various embodiments, any number of client devices 135 may communicate with the video server 140.

The network 120 enables communication between the video server 140, the client device 135, and the camera 130. The network 120 may include any combination of local area and/or wide area networks, using both wired and/or wireless communication systems. In one embodiment, the network 120 uses standard communications technologies and/or protocols.

Various components of the environment 100 of FIG. 1 such as the camera 130, video server 140, and client device 125 can include one or more processors and a non-transitory computer-readable storage medium storing instructions therein that when executed cause the processor to carry out the functions attributed to the respective devices described herein. Furthermore, the processes described herein may be performed in the camera 130, on the video server 140, or on the client device 125.

Generating Composite Images or Video

Figure 2A:
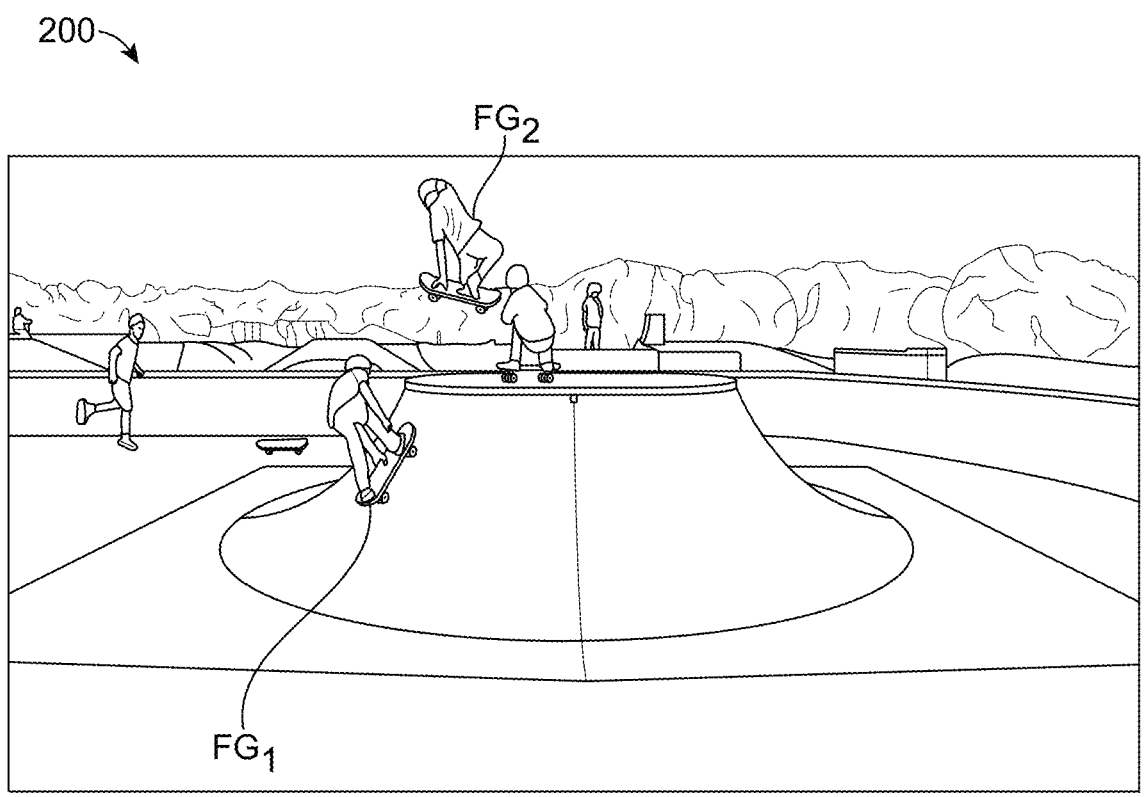
FIG. 2A illustrates an example embodiment of a composite image.

In an embodiment, an application executing on the camera 130, the video server 140, or the client device 125 receives an input video comprising a sequence of frames and generates a composite image or a video having composite video frames. FIG. 2A illustrates an example of a composite image 200. In the composite image 200, two foreground object images $FG_1$, $FG_2$ have been extracted from selected earlier video frames and overlaid on a current video frame, thus depicting the foreground object at its current location and a subset of prior locations. This achieves the visual effect of showing the historical path of the object on a single image.

Composite images may be used as frames of an output video. Here, the foreground object images $FG_1$ and $FG_2$ are overlaid onto each frame of video that follows the frame from which they were extracted. As the video progresses, additional foreground object images may be extracted at selected frames and then added to all subsequent frames together with $FG_1$ and $FG_2$. Thus, each frame of video depicts the foreground object at a number of prior locations so as to have the visual effect of "freezing" a copy of the object at selected locations along its historical path.

Figure 2B:
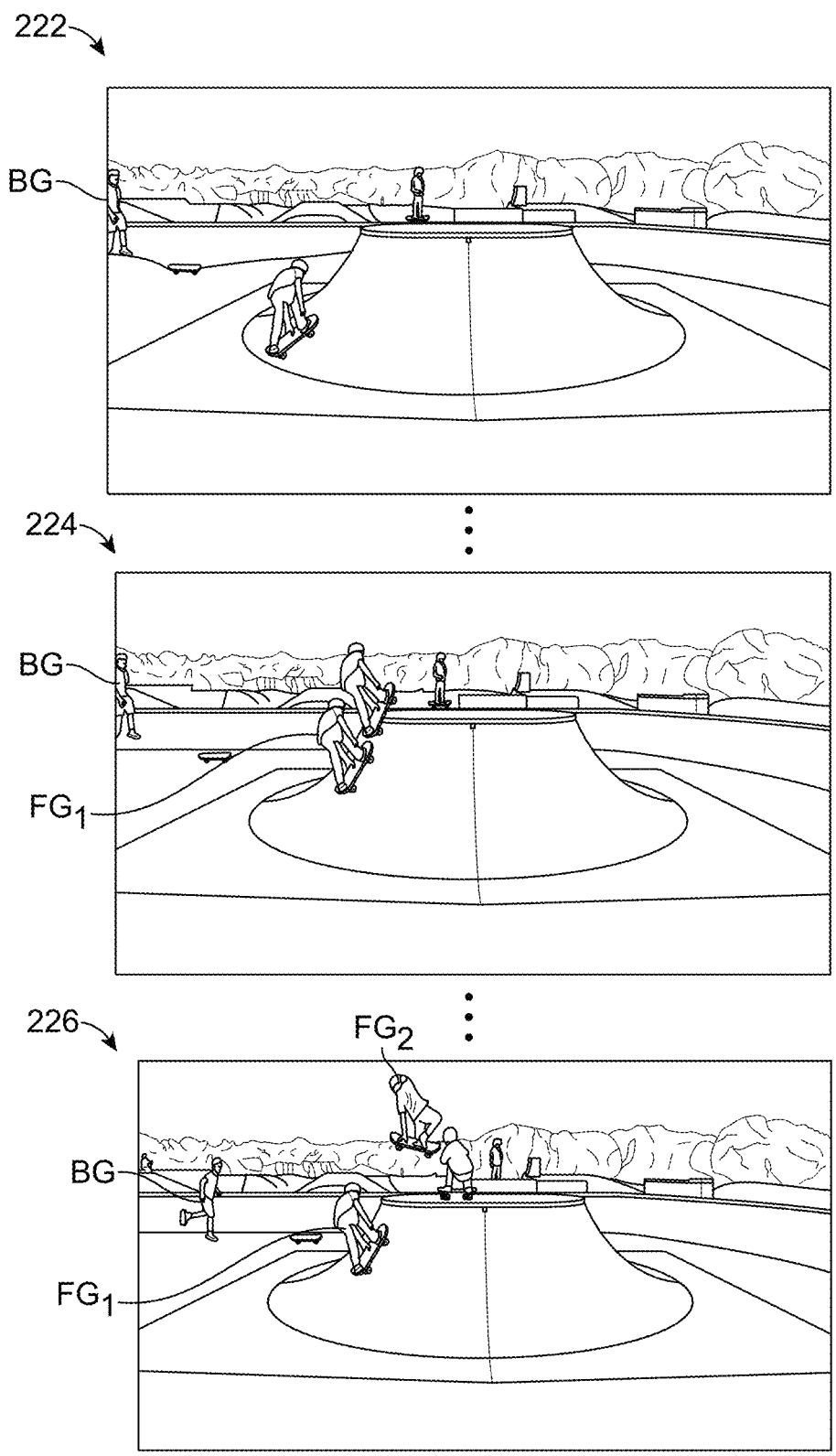
FIG. 2B illustrates an example embodiment of video frames including composite frames.

FIG. 2B illustrates sample frames from an output video having composite frames. A first frame 222 depicts a frame of video prior to any composite frames being generated. At a later frame 224 a first foreground object image FG1 has been overlaid onto the scene. At another subsequence frame 226 a second foreground object image FG2 has been overlaid onto the scene in addition to foreground object image FG1, thus creating the visual effect of showing a trail of the foreground object's path. Apart from adding the overlaid foreground object images FG1, FG2, the video frames are otherwise preserved. For example, background motion is preserved as can be seen, for example, by the background object BG which moves across the scene as the frames advance.

Figure 3:
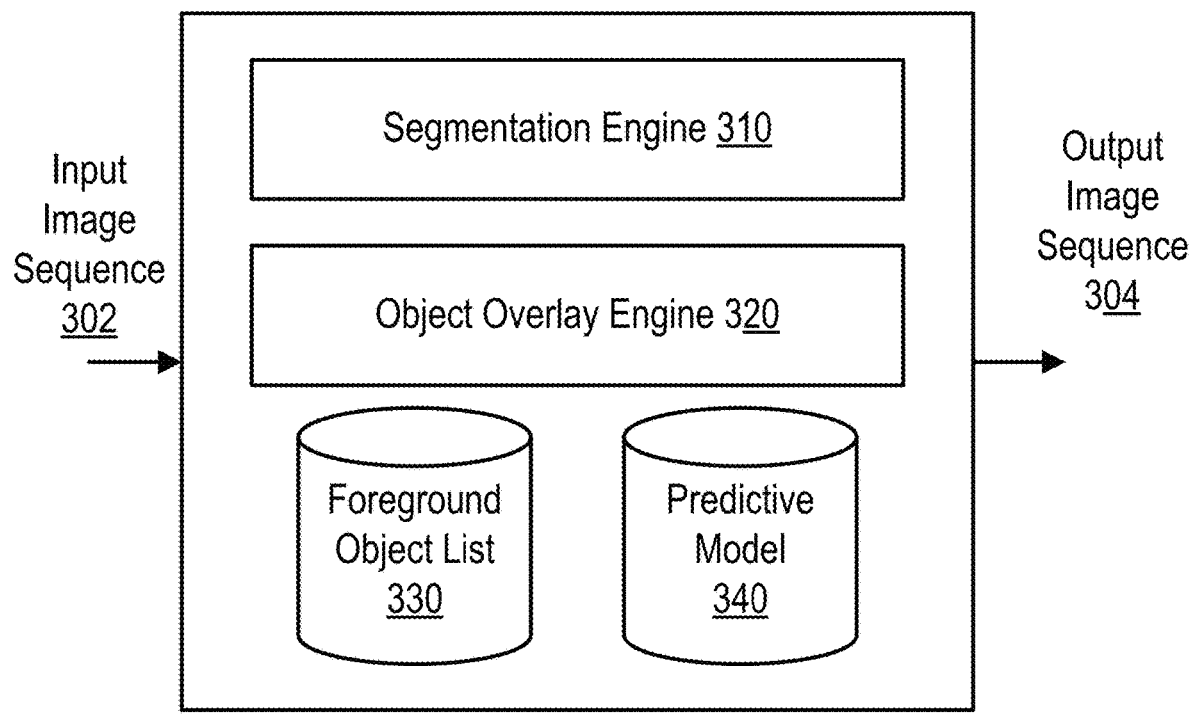
FIG. 3 illustrates an example embodiment of an application for generating composite images or video frames.

FIG. 3 illustrates an embodiment of an application 300 for generating a composite image or a video having composite frames from an input image sequence 302 (e.g., a video). In one embodiment, the application 300 comprises a segmentation engine 310, an object overlay engine 320, a foreground object list 330, and a predictive model 340. The segmentation engine 310 and object overlay engine 320 may be embodied as instructions stored to a non-transitory computer-readable storage medium that when executed by a processor causes the processor to carry out the functions attributed to these components as described herein. Furthermore, the foreground object list 330 and predictive model 340 may be embodied as data structures stored to a memory (e.g., a non-transitory computer-readable storage medium).

The segmentation engine 310 receives the input image sequence 302 and for one or more images of the input image sequence 302 performs a foreground/background segmentation to separate a foreground object image from a background image. The foreground object image depicts the foreground object with the background pixels subtracted out (i.e., the pixel locations corresponding to the background in the foreground object image are transparent). The segmentation engine 310 performs the foreground/background segmentation based on a predictive model 340 described in further detail below. The foreground object typically exhibits some motion relative to the background image and thus appears at different spatial locations in different images of the input image sequence 302. At each image in which the segmentation engine 310 performs the foreground/background segmentation, the extracted foreground object image is stored to the foreground object list 330. The foreground object images in the foreground objects list 230 therefore represents a sequence of foreground object images as extracted from various frames in the input image sequence 302.

The object overlay engine 320 performs image overlays to generate composite images (which may be frames of video). Particularly, to generate a composite image, the object overlay engine 330 overlays each of the previously stored foreground object images in the foreground object list 330 onto a base image to generate a composite image. This overlay replaces the pixels of the base image with pixels of each of the foreground object images at pixel locations corresponding to the foreground object in the foreground object images. An output image sequence 304 is generated by overlaying the foreground object images onto one or more images in the input image sequence 302.

In an embodiment, the segmentation engine 310 performs segmentation using an adaptive Gaussian mixture model (GMM). A GMM is a probabilistic model represented as a weighted sum of K Gaussian component densities $$P(X_t) = \sum_{i=1}^{K} \omega_{i,t} \mathcal{N}(X_t \mid \mu_{i,t}, \Sigma_{i,t}), \tag{1}$$

where X is a K-dimensional data vector, $\omega_i$, i=1, ..., K are the mixture weights, and $\mathcal{N}(X_t|\mu_{i,t},\Sigma_{i,t})$, i=1, ..., K are the Gaussian component densities. $\mathcal{N}$ has the form $$\mathcal{N}(X_t \mid \mu_{i,t}, \Sigma_{i,t}) = \frac{1}{(2\pi)^{K/2}} \frac{1}{|\Sigma_{i,t}|^{1/2}} \exp\left(-\frac{1}{2}(X_t - \mu_{i,t})^T \sum_{i,t}^{-1} (X_t - \mu_{i,t})\right) \tag{2}$$

with mean vector $\mu_{i,t}$ of the $i^{th}$ Gaussian mixture at time t and covariance matrix $\Sigma_{i,t}$ of the $i^{th}$ Gaussian mixture at time t. The mixture weights satisfy the condition $\Sigma_{i=1}^{K}\omega_1=1$.

GMMs are often used for data clustering since the specific distribution of the data is not required to be known a priori. In an adaptive GMM, the number of components within the model are adjusted as new data points are received, allowing the model to be more robust to the variability in the data. In the training step used herein, a pixel-wise approach is taken in which an adaptive GMM is applied to every pixel. For example, beginning with the first image $I_0$ in the sequence, each pixel's red-green-blue (RGB) color values are clustered using the GMM. The clustered pixels generally may represent the same object or similar colors in the image. The number of clusters is variable which provides adaptability to varying scene changes such as illumination changes. A property of the adaptive GMM is that foreground objects in an image are usually represented by clusters with small weights. Therefore, the background image can be approximated by the B largest clusters:

$$\hat{p}\left(x \mid \chi, BG\right) \sim \sum_{i}^{B} \omega_i \mathcal{N}(x; \mu_i, \sigma_i^2 I) \tag{3}$$

where x is a sample pixel and $\chi$ represents all the pixel data. If the clusters are sorted according to their descending weights, then $$B = \operatorname{argmin}_b \left( \sum_{i=1}^{B} \omega_{i,t} > M \right) \tag{4}$$

where M is a measure of the maximum amount of data that can belong to a foreground object without influencing the background image. The remaining clusters are considered to represent the foreground distribution. The foreground can contain multiple foreground objects (or clusters of pixels). In one embodiment, additional post-processing may be applied to determine if the foreground pixels represent a single object or multiple distinct foreground objects. Equations (3) and (4) can be used to generate a binary mask representing the locations of the foreground and background objects.

Given a new frame at time t+1, each pixel undergoes a match test, which determines if it belongs to a particular cluster. The Mahalanobis distance is used to perform the match test:

$$\left((X_{t+1} - \mu_{t+1})^T \sum_{i=1}^{b} (X_{t+1} - \mu_{t+1})\right)^{0.5} < k * \sigma_{i,t} \tag{5}$$

where k is a constant value (e.g., k=3.0). If the sample pixel passes the match test (the computed distance is less than the threshold), then the sample pixel belongs to that Gaussian cluster. If there are no good cluster matches, a new cluster is generated. In order to be robust to dynamic changes in the scene, the parameters of the GMM are updated using an exponentially decaying envelope that limits the influence of old data. If the sample pixel passes the match test for one of the K Gaussian clusters, the parameters are updated as follows:

$$w_{i+1} = w_i + \alpha(1 - w_i) - \alpha c_T \quad (6)$$

$$\mu_{i+1} = \mu_i + \frac{\alpha}{w_i}(X_t - \mu_i)$$

$$\sigma_{i+1} = \sigma_i + \frac{\alpha}{w_i}((X_t - \mu_i)^T(X_t - \mu_i) - \sigma_i)$$

The hyper-parameter α is the learning rate for the model, specifying how quickly the model is updated. Similarly, α can be described as the inverse of the time adaptation period T, such that α=1/T. In other words, T is the number of frames used within the GMM. Therefore, α is usually small (between 0 and 1) where a small alpha (0.001) leads to a slowly updating background model. Additionally, the number of Gaussian clusters is selected by using the Dirichlet prior, $c_T$, and applying it to the update weight equation. The Dirichlet prior $c_T$ has negative weights (hence the negative sign on $\alpha c_T$) which suppresses the clusters that are not supported by the data. When a cluster's weight $w_i$ becomes negative, it is discarded, thus adaptively adjusting the number of components within the GMM.

If the sample pixel fails the match test for all of the K Gaussians, the parameters are instead updated as follows:

$w_{i+1}$=Lowest Prior Weight $\mu_{i+1}=X_{i+1}$ $\sigma_{i+1}$=Large Initial Variance $\quad (7)$ Lastly, if the maximum number of clusters has been reached, then the component with the smallest weight is removed.

In alternative embodiments, a different foreground/background model is used that is not necessarily based on a GMM.

Figure 4:
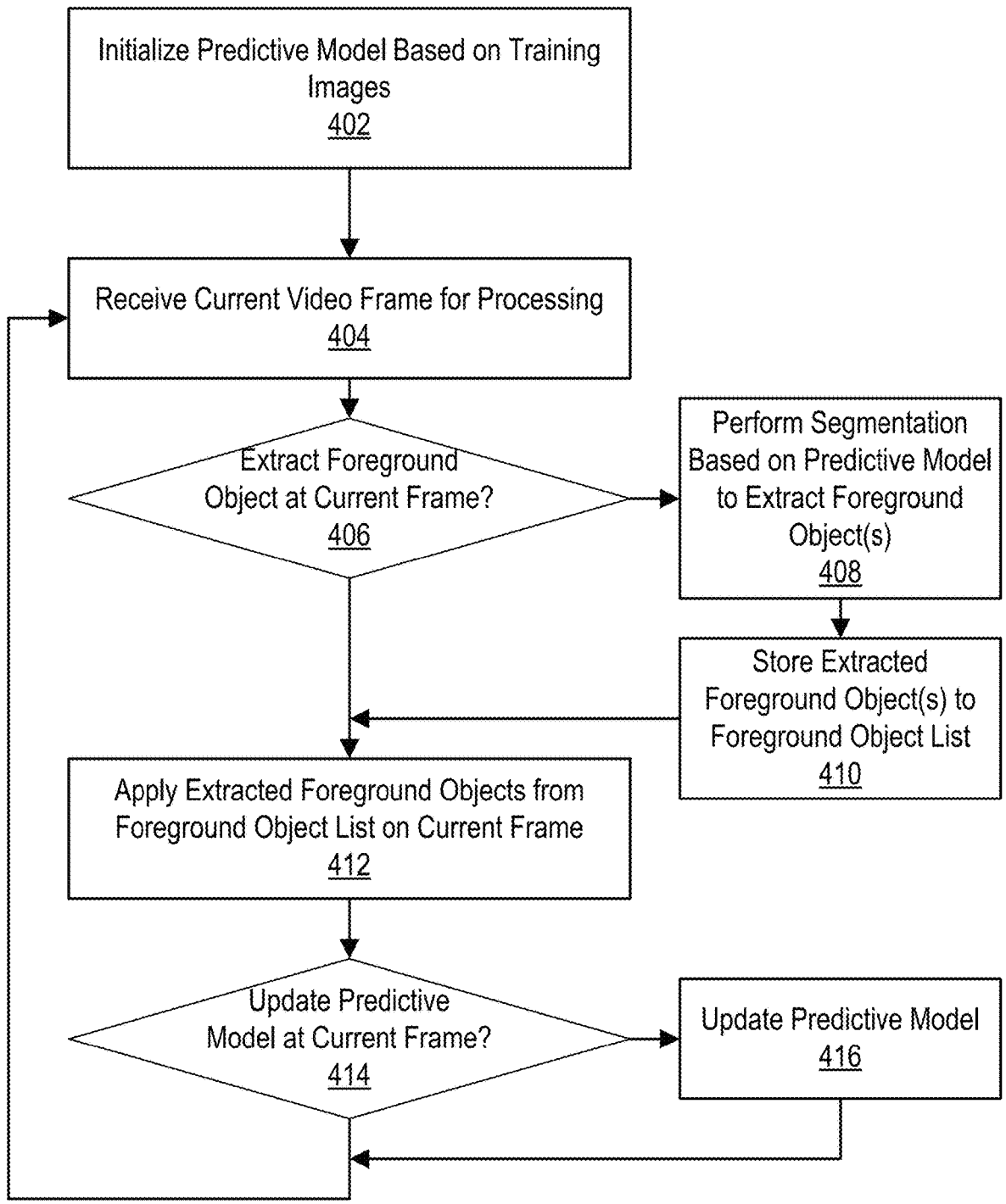
FIG. 4 illustrates a first example embodiment of a process for generating a composite image from a sequence of input images.

FIG. 4 illustrates an embodiment of a process for generating composite frames from a sequence of images (e.g., a video). The predictive model is initialized 402 based on a plurality of training images using equations (1)-(7) above. For example, in one embodiment, the training images comprise the first P images of a sequence of images $I_t$=0, . . . , N−1 where N is the total number of images. The images may be either time-lapsed images or sequential video frames.

After training the predictive model using the P training images, a current image $I_t$ in the image sequence I is received 404 for processing. It is next determined 406 whether or not to extract a foreground object image at the current image $I_t$. For example, in one embodiment, the foreground object image is extracted every Y images. In an example implementation, Y is set to 15 images. If it is determined to extract the foreground object image at the current image, a foreground/background segmentation is performed 408 on the current image based on the predictive model to extract the foreground object image. For example, in one embodiment, equations (3)-(4) described above are applied to generate the background image and the foreground object image from the current image $I_t$ in the form of a binary mask representing the pixel locations of the foreground pixels. The extracted foreground object image is then stored 410 to the foreground object list. If it is determined not to extract the foreground object image at the current image, steps 408, 410 are skipped. Then, whether or not a segmentation was performed for the current image, all of the foreground object images in the foreground object list are applied 412 to the current image $I_t$ to generate the composite image. In one embodiment, the foreground object list may store the RGB pixels to be directly overlaid in the composite image. Alternatively, the foreground object list may store the binary mask which is then applied to the corresponding frame to generate the RGB pixel data to apply to the composite image.

The predictive model may also be updated periodically or when certain conditions are met. For the current image, it is determined 414 whether or not to update the predictive model. For example, in one embodiment, the predictive model is updated every X images where X is typically less than Y. In an example implementation, X is set to 2, thus updating the predictive model every second image. In alternative embodiments, different values for X may be used. If it is determined to update the predictive model at the current image $I_t$, the predictive model is updated 316 according to equations (5)-(7) described above. The process then repeats from step 404 for the next image in the sequence.

When generating a video according to the process of FIG. 4, the background is updated every frame. Thus, motion in the background appears the same in the output video as in the input video. Furthermore, a new foreground object image at its present location is added every Y frames. The visual effect is one of showing a path of the foreground object as it moves across a video background scene. Beneficially, the computationally intensive process of performing the foreground/background segmentation does not need to be performed for every image and is instead performed only at the images in which the foreground object is to be added to the foreground object list (e.g., every Y images).

Figure 5A:
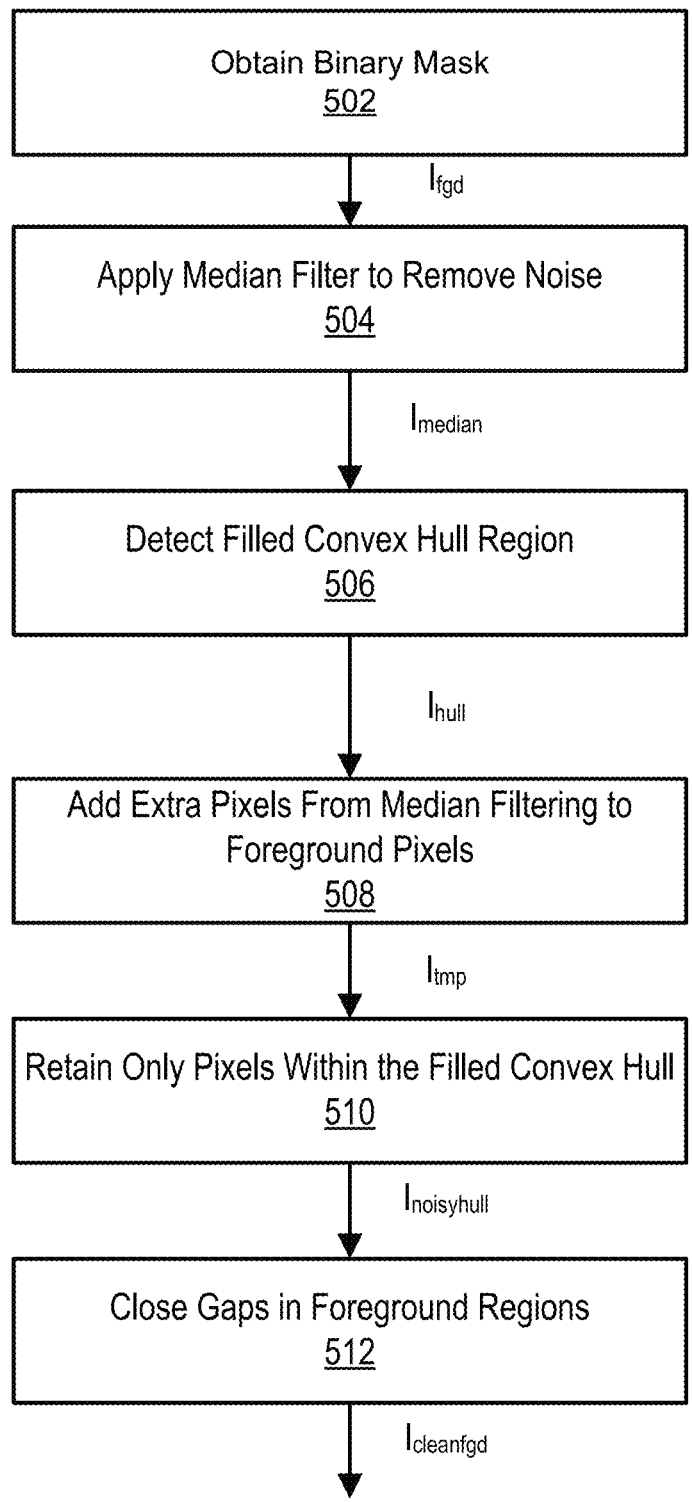
FIG. 5A illustrates an example embodiment of a process for reducing noise in a composite image.
Figure 5B:
FIG. 5B illustrates example intermediate images in a process for reducing noise in a composite image.
Figure 5B:
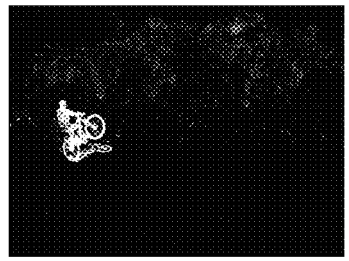
Figure 5B:
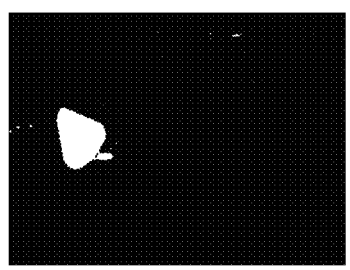
Figure 5B:
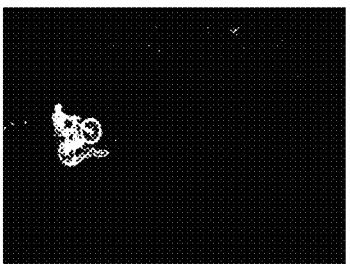
Figure 5B:
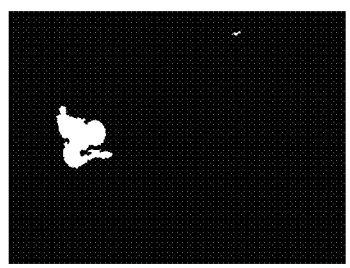

In one embodiment, performing the foreground/background segmentation in step 414 comprises processing the segmented images to remove or reduce noise. FIG. 5A illustrates an embodiment of a process for noise removal and FIG. 5B illustrates example images visually depicting the noise removal process. A binary mask $I_{fgd}$ 553 is obtained 502 from an original image 551 representing pixel locations corresponding to a preliminary foreground object image. A median filter (e.g., a 5×5 median filter) is applied 504 to remove speckled-like noise, thus producing an intermediate image $I_{median}$. The median filtering removes much of the noise in the true background areas, but it also removes some true foreground areas as well. To replace the lost foreground pixels, a filled convex hull region $I_{hull}$ 555 of the preliminary foreground image is detected 506. The foreground pixels and any extra pixels removed from the median filtering are added 508 by applying a bit-wise OR of $I_{median}$ and $I_{fgd}$ to generate a temporary image $I_{tmp}$. Then, only the pixels within the filled convex hull regions are retained 510 while other pixels outside the filled convex hull region are discarded. This operation may be performed by a binary AND of $I_{tmp}$ and $I_{hull}$ to generate $I_{noisyhull}$ 559. Gaps in the foreground region are closed 512. For example, a binary morphology closing operation (e.g., using a disk size of 9×9) may be applied to $I_{noisyhull}$ 559 to close small gaps. Furthermore, any remaining holes of a user-specified size may be filled to generate the foreground object image $I_{cleanfgd}$ 561.

Figure 6:
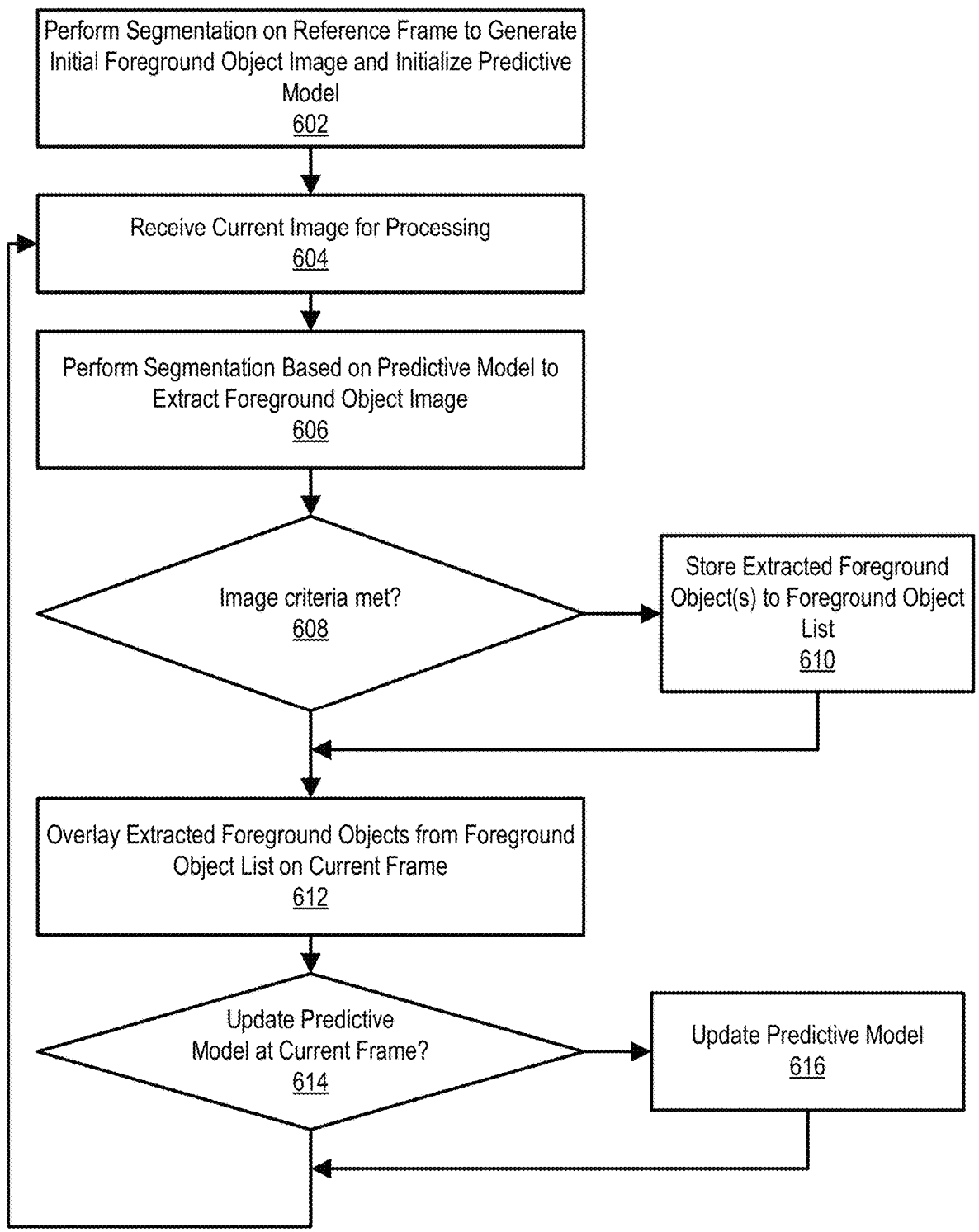
FIG. 6 illustrates a second example embodiment of a process for generating a composite image from a sequence of input images.

In an alternative embodiment, instead of having a fixed frame interval Y for updating the foreground object list, the foreground object list may be updated at variable intervals based on an analysis of the images as illustrated in the embodiments of FIG. 6. This technique may be used, for example, to generate composite images with uniform spacing between the foreground object images in the composite image even if the foreground object is not moving at uniform speed. Alternatively, this technique may be used to improve the quality of the foreground object images in the composite image by selecting foreground object images that meet some predefined image criteria.

In the process of FIG. 6, a segmentation is performed 602 on a reference frame to generate an initial foreground object and initialize the predictive model. A current image in the image sequence is then received 604 for processing. A foreground/background segmentation is then performed 606 on the current image to extract a foreground object image. If an image criteria is met at step 608, the extracted foreground object image is added 610 to the foreground object list and otherwise step 610 is skipped. For in one embodiment, an image quality metric may be used to determine 608 whether or not to add the foreground object image to the foreground object list. For example, an image having a sharpness above a particular threshold may be added to the foreground object list. In another embodiment, the presence or absence of a particular image feature may be used to determine 608 whether or not to add the foreground object image to the foreground object list. Here, for example, an image may be added to the foreground object list if a face is detected in the foreground object image. In another embodiment, motion parameters may be used to determine 608 whether or not to add the foreground object to the foreground object list. For example, the object may be added when it is detected that it is at its peak height, peak velocity, peak acceleration, etc.

In one embodiment, in order to provide uniform spacing between the overlaid foreground objects snapshots, an overlap percentage is determined between the foreground object extracted in the current image and the most recently stored foreground object in the foreground object list. If the percentage drops below a threshold $T_d$, the criteria in step 608 is met and the foreground object image for the current image $I_t$ is added to the foreground object list. In another embodiment, a secondary criteria may be used to select among a group of foreground object images that fall within a predefined range of overlap percentages using any of the selection criteria described above (e.g., image quality, face detection, motion parameters, etc.). This ensures that the best foreground object image will be selected from among a group of candidate foreground object images, that will each approximately meet the desired spacing from the previous foreground object image.

Figure 7A:
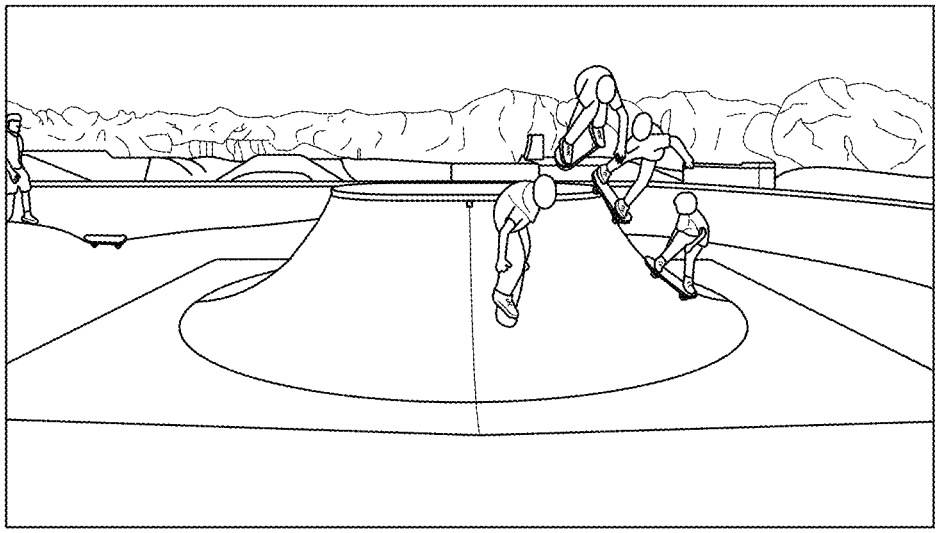
FIG. 7A illustrates a first example embodiment of a composite image with uniform spacing between foreground object images.
Figure 7B:
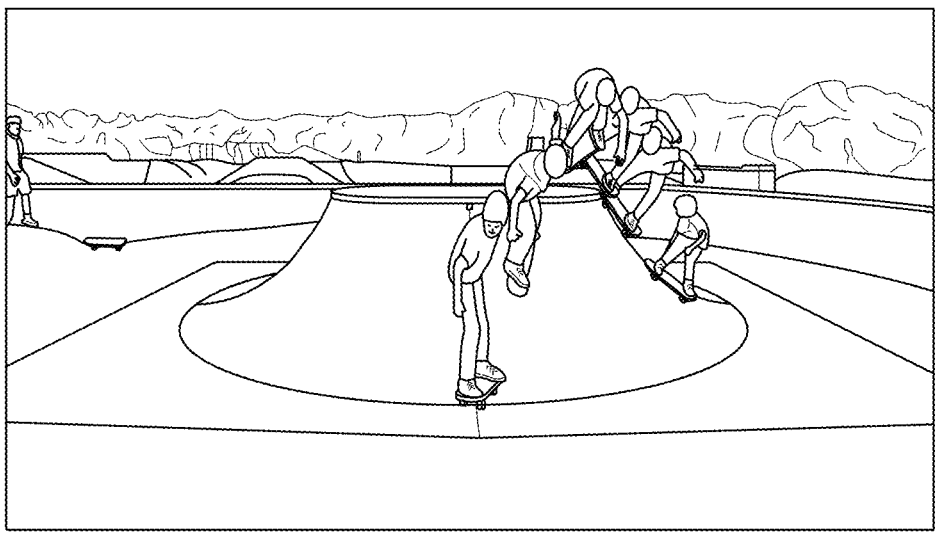
FIG. 7B illustrates a second example embodiment of a composite image with uniform spacing between foreground object images.

FIGS. 7A and 7B provide examples of composite images in which each of the foreground object images is selected to have an approximately uniform overlap with the previous foreground object image. For example, in FIG. 7A, the overlap percentage threshold $T_d$ is set to 3%. In FIG. 7B, the overlap percentage threshold $T_d$ is set to 21% thus resulting in foreground object images that are closer together than in FIG. 7A.

Figure 8:
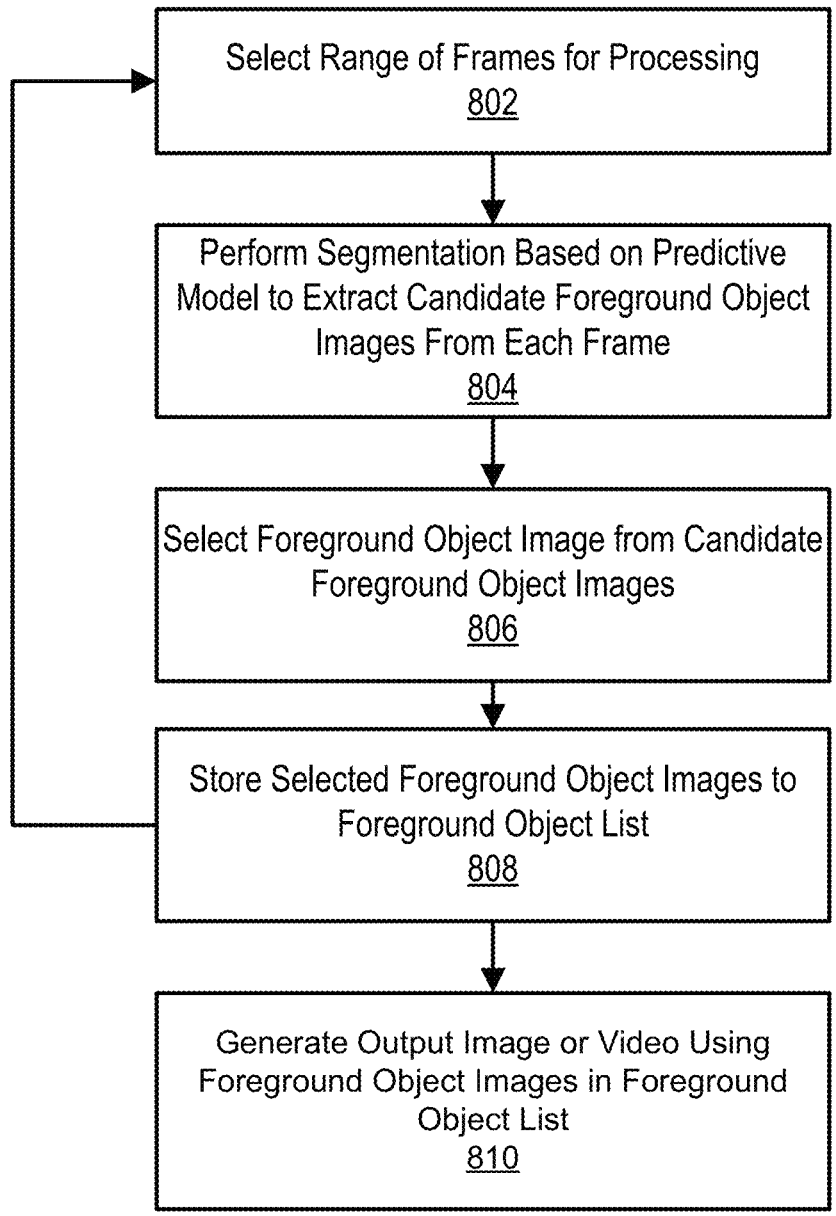
FIG. 8 illustrates a third example embodiment of a process for generating a composite image from a sequence of input images.

FIG. 8 illustrates another embodiment of a process for generating a composite image or a video having composite image frames. In this embodiment, rather than processing the sequence of images one frame at a time, the video is post-processed in a manner that processes a range of frames at a time to generate a plurality of candidate foreground images, and then a foreground image is selected from among the candidates to add to the foreground object list. Particularly, a range of images in the sequence of images is selected 802 for processing. For example, a group of Z consecutive frames of a video are selected or a group of Z burst images are selected from a time lapse image capture. A foreground/background segmentation is performed 804 based on the predictive model to extract a candidate foreground object image from each frame in the selected range. A foreground object image is then selected from among the candidate foreground object images. For example, the foreground object image may be selected based on any of the criteria described above such as, for example, the foreground object image having a highest quality metric, a highest likelihood of face detection, a peak motion parameter, etc. The selected foreground object image is stored 808 to the foreground object list. This process may repeat for additional frame ranges. For example, the process may repeat every Y frames where Y>Z. This ensures that at least one foreground object image is added to the foreground object list every Y frames, but provides some flexibility in which foreground object image is selected in order to improve quality of the output video. Furthermore, the foreground/background segmentation need not be performed for the non-selected frames (e.g., frames that are not in the group of Z frames). After generating the foreground object list, a composite output image or video is generated. For example, to generate an output video, the foreground object images are selectively overlaid on appropriate frames of the output video such that for any given frame, the foreground object images corresponding to frames earlier than the given frame are overlaid on the given frame. The process of FIG. 8 may additionally include periodically updating the predictive model (e.g., every X frames) as described above.

In any of the above-described methods, a transformation may be applied to one or more foreground object images to compensate for camera motion that occurs between capturing different images corresponding to the composite frames. In this manner, each composite frame depicts the foreground object from the current camera viewpoint. Thus, for example, if both the foreground object and the camera are moving from left to right such that the foreground object remains centered in each frame, the foreground object images can be transformed to compensate for the camera movement and properly depict the left to right motion of the foreground object, thus depicting a sequence of foreground objects beginning near the left edge and ending at the center at the present location of the foreground object. Similarly, foreground object images may be scaled to compensate for the camera moving along a z-axis (i.e., into or out of the scene), closer to or further from the path of the foreground object. In some embodiments, where multi-view images are available or can be generated, three-dimensional foreground objects may be constructed that can be rotated to compensate for rotation of the camera about the object. Thus, for example, the foreground object image may be rotated to provide the view of the overlaid foreground object that the camera would have seen had it captured the overlaid foreground object from its current rotational position.

Figure 9:
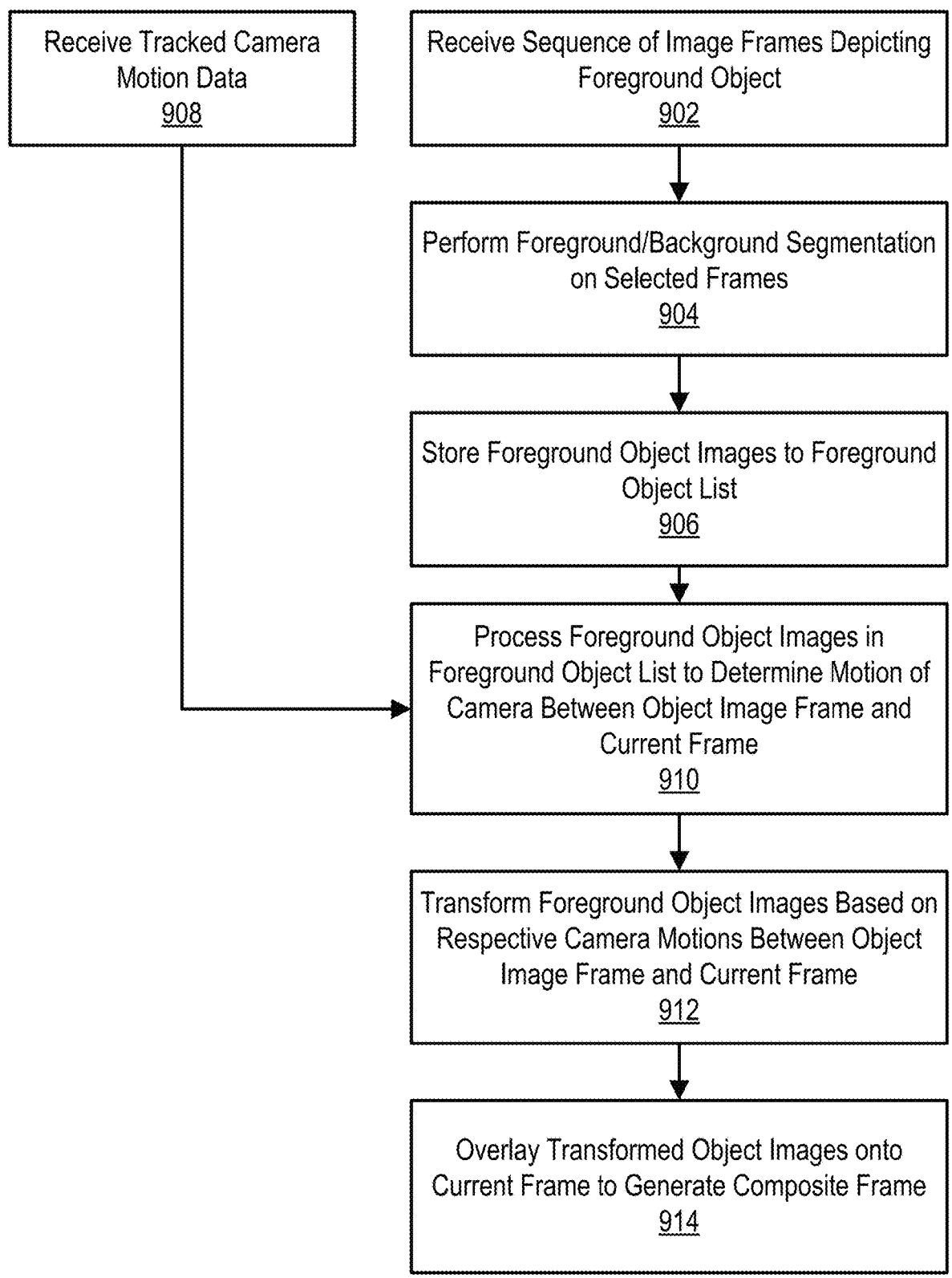
FIG. 9 illustrates an embodiment of a process for generating a composite image from a sequence of input images when the camera is experiencing camera motion.

FIG. 9 illustrates an embodiment of a process for generating a composite image in the presence of camera motion. A sequence of image frames depicting a foreground object is received 902 that are captured by a camera while the camera is undergoing motion. As a result of the camera motion, the actual path of the foreground object is not clearly defined from the image sequence. For selected frames in the sequence of image frames, a foreground/background segmentations is performed 904 to extract respective foreground object images that each comprise a representation of the foreground object with the background pixels subtracted. The process of selecting frames from which to extract the foreground object images and performing the foreground/background segmentation may be performed according to any of the various implementations described above or other implementations. Each respective foreground object image is stored 906 to a foreground object list. Motion information of the camera is also tracked 908 and stored corresponding to each foreground object image. For example, the camera's motion may be tracked based on various motion sensors integrated with the camera, and motion or position data may be stored in associated with each foreground object image that represents a relative or absolute position or motion of the camera when the corresponding frame was captured. Alternatively, image analysis may be performed to determine camera motion without necessarily relying on sensor data from in-camera sensors. For example, in one embodiment, features are extracted and tracked between different frames. The feature motion may then be fit to a motion model of the camera to estimate the camera motion.

To generate a composite frame, each of the respective foreground object images in the foreground object list is processed 910 to determine a respective motion of the camera between the position of the camera when the corresponding frame was captured and the current position of the camera corresponding to the frame on which the foreground object images are being overlaid. Each of the foreground object images is then transformed 912 based on the respective motions to generate transformed foreground object images. In one embodiment, the transformation may compensate for at least one of translational motion of the camera in x, y, and/or z directions, rotational motion of the camera about a reference point (which may correspond to the foreground object), and pointing motion of the camera corresponding to a change in the camera orientation along any of the three axes. The transformed foreground object images are then overlaid 914 onto the current frame to generate a composite output image. As described above, this technique may be used to generate videos with composite frames that have a dynamic moving background or this technique may be used to generate individual composite images from a sequence of images.

Different translations may be applied to the foreground object images depending on the type of camera motion between the frame when the foreground object image was captured and the frame on which it is being overlaid. For example, in order to compensate for planar motion of the camera in the x,y plane, a location of the representation of the foreground object in each of the foreground object images being overlaid is translated to compensate for the change in planar position of the camera between capturing the selected frame corresponding to the foreground object image and capturing the current frame over which the foreground object image is being overlaid. Here, the transformation may involve translating the location of the overlaid foreground object image in a manner equal and opposite to the change in planar position of the camera between capturing the selected frame corresponding to the foreground object and capturing the current frame.

In another example, in order to compensate for motion of the camera along the z-axis (e.g., towards or away from the scene), the translation involves scaling the representation of the foreground object in the foreground object image based on a component of the motion representing a change in position along the z-axis (e.g., depth axis) between capturing the selected frame and capturing the current frame. Particularly, the foreground object may be enlarged in response to the camera being moved closer to the position of the foreground object when the selected frame was captured, and the foreground object may be reduced in size in response to the camera being moved further away from the position of the foreground object when the selected frame was captured.

In another example, a location of the foreground object may be translated based on a component of the motion representing a change in rotational position of the camera about a reference point between capturing the selected frame and capturing the current frame. Particularly, the location may be translated according to a motion equal and opposite to the motion representing the change in rotational position of the camera between capturing the selected frame and capturing the current frame. Furthermore, in embodiments in which three-dimensional foreground object images are available (as may be captured, for example, by multi-view camera systems or generated from stereo views using image processing techniques), the foreground object image may be rotated to compensate for the change in rotational camera position about the object.

In yet another example, the location of the foreground object may be translated based on a component of the motion representing a change in pointing orientation of the camera between the current frame and the selected frame. Furthermore, when a change in pointing orientation occurs, a lens distortion effect may be applied to the representation of the foreground object based on the change in pointing orientation of the camera between the current frame and the selected frame. For example, in a wide-angle or "fisheye" lens, objects appear more stretched around the edges of the image than in the center of the image. Thus, an foreground object image that was originally captured in the center portion of the image but overlaid near an edge of a subsequent image due to a change in pointing orientation may have a distortion effect applied to mimic how the object would have looked if originally captured near the edge of the image. Similarly, a foreground object originally captured near an edge of an image may have a reverse distortion effect applied if it appears near the center of the image in the frame on which it is overlaid.

In one embodiment, a partial transparency may be applied to overlaid foreground object images that appear very close to the camera so that they do not block the view of the rest of the scene in a case where the object path has a component along the z-axis towards the camera or away from the camera. For example, in one embodiment, it is detected when an overlaid foreground object image exceeds an overlap threshold with one or more other overlaid foreground object images. A partial transparency is then applied to the detected foreground object image exceeding the overlap threshold. In other embodiments, different threshold criteria may be used. For example, a partial transparency may be applied dependent on a percentage of the image covered by the overlaid foreground object image. In other embodiments, the partial transparency may be applied dependent on a detected depth of the overlaid foreground object. In additional embodiments, the amount of transparency may be variable and change with the distance of the object to the camera using any of the detection methods discussed above.

In other embodiments, where a camera at least partially rotates around the foreground object image at a rate significantly faster than motion of the object, a multi-view foreground object image may be stored comprising a set of two or more foreground object images each depicting the foreground object from a different viewpoint. The multi-view foreground object image enables the foreground object to be rotated within the composite frame to depict any one of the different views. The particular view may be selected manually by a viewer via a user interface that enables the user to rotate a three-dimensional or partial three-dimensional view of the foreground object image to provide an interesting viewing effect. Alternatively, the particular view of the multi-view foreground object image may be selected automatically when overlaying the multi-view foreground object image on a frame. For example, the view may be selected that best matches the camera viewpoint in the selected frame on which the multi-view foreground object image is being overlaid. In one embodiment, the multi-view foreground object image may comprise a stereo foreground object image having left and right images that can be viewed as a three-dimensional object using a conventional stereo viewer. In yet further embodiments, similar effects may be applied to multi-view foreground object images captured concurrently using multiple cameras from different viewpoints, such as, for example, a stereo camera or multi-view camera system.

In yet other embodiments, composite images or video frames may be generated in for stereo (three-dimensional) images in which each overlaid foreground object image comprises a stereo image having left and right views. The disparity between the left and right images corresponds to the depth of the image when viewed using a stereo viewing system. Particularly, foreground object images having a positive disparity (e.g., the object location in the left image is to the left of the object location in the right image) appear behind a convergence depth (e.g., corresponding to the viewing screen), foreground object images having a negative disparity (e.g., the object location in the left image is to the right of the object location in the right image) appear in front of a convergence point, and foreground object images having zero disparity (e.g, the object location is the same in the left and right images) appear at the convergence depth. When overlaying stereo foreground objects on stereo frames, the disparity between the left and right foreground object images may be adjusted to provide the appropriate disparity based on their depth and the convergence depth for the current frame. For example, the convergence depth for the current frame may be set to correspond to the depth of the foreground object based on its current location. Overlaid foreground object images behind the plane corresponding to the current object depth are depicted with a positive disparity having increasing magnitude as they become farther away from the viewer while overlaid foreground object images in front of the plane corresponding to the current object depth are depicted with negative polarity having increasing magnitude as they become closer to the viewer.

Figure 10:
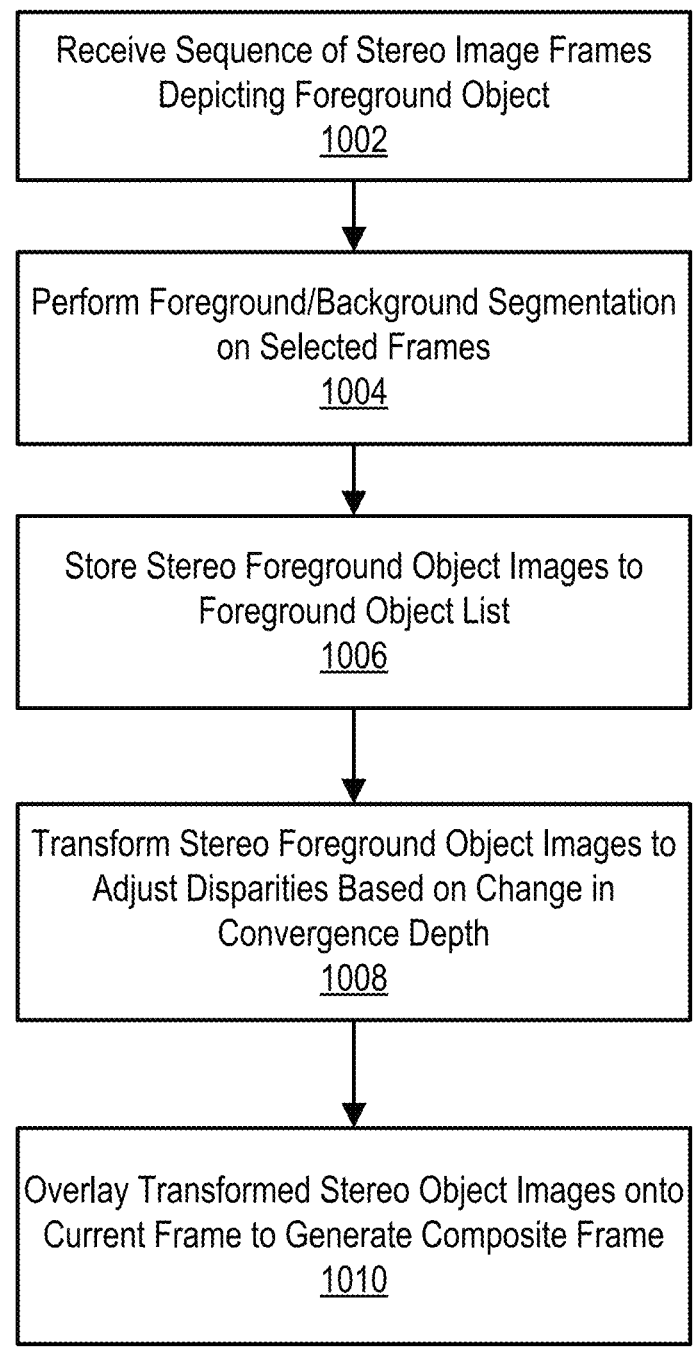
FIG. 10 illustrates an embodiment of a process for generating a composite image having stereo foreground objects from a sequence of stereo input images.

FIG. 10 illustrates an embodiment of a method for generating a composite output image having stereo foreground objects. A sequence of stereo video frames are received 1002 depicting a foreground object. For selected frames in the sequence of stereo video frames, foreground/background segmentations are performed 1004 to extract respective stereo foreground object images which each comprising a representation of the foreground object with background pixels subtracted. The respective stereo foreground object images are stored 1006 to a foreground object list. Each of the stereo foreground object images thus include left and right images with a disparity between them. The stereo foreground object images are transformed 1008 to adjust the respective disparities between the respective left and right images based on a change between a convergence depth for the respective selected frames and a convergence depth for the current frame. For example, the disparity is decreased (i.e., becomes less positive or more negative) for a given stereo foreground object image in response to the convergence depth for the current frame being further away than a convergence depth for a selected frame corresponding to the given stereo foreground object, and the disparity is increased (i.e., becomes more positive or less negative) in response to the convergence depth for the current frame being closer than the convergence depth for the selected frame corresponding to the given stereo foreground object.

In addition, any of the techniques described above for compensating for camera motion (e.g., translations, rotation, scaling, partial transparencies, etc.) may similarly be applied to stereo foreground object images. Notably, some level of rotation may be achieved when stereo foreground object images are available and thus rotation may be applied to account for rotational camera motion.

In alternative embodiments, instead of directly capturing stereo frames, two-dimensional frames may be captured and stereo foreground object images may be generated from the two-dimensional capture by artificially applying a disparity to the extracted foreground object image. Where camera motion involves rotation about the object, views from different orientations may be selected to create the stereo foreground object images so as to provide a more complete three-dimensional view of the object.

Stereo foreground objects may be used together with any techniques described above in FIGS. 1-9 to generate composite videos having composite frames and dynamically moving background or such techniques may be used to generate individual composite images.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for generating a composite output image from an input video having a sequence of frames, the method comprising:

initializing a predictive model based at least on a plurality of training images;

receiving a sequence of image frames depicting a foreground object, the sequence of image frames captured by a camera experiencing motion;

for selected frames comprising a first quantity of frames in the sequence of image frames, (i) performing by a processing device, foreground/background segmentations to extract, based at least on the predictive model, a set of respective candidate foreground object images each comprising a representation of the foreground object with background pixels subtracted, the performing of the foreground/background segmentations comprising, based at least on an image criterion associated with each of the respective candidate foreground object images, selecting a foreground object image from the set of respective candidate foreground object images, and (ii) storing the selected foreground object image to a foreground object list, the foreground object list comprising a plurality of foreground object images selected from respective sets of candidate foreground object images, the selecting of the foreground object image occurring at least once for every second quantity of frames, the second quantity of frames being greater than the first quantity of frames;

determining, for each of the selected foreground object images in the foreground object list, a respective motion between (i) a position of the camera at which a selected frame corresponding to a respective selected foreground object image was captured and (ii) a position of the camera capturing a current frame of the respective selected foreground object image;

transforming the representation of foreground objects in the selected foreground object images based on the respective motion to generate transformed foreground object images; and overlaying the transformed foreground object images onto the current frame to generate a composite output image.

2. The method of claim 1, wherein the transforming of the representation comprises:

translating a location of the representation of the foreground object in the respective selected foreground object images based on a component of the motion, the component of the motion representing a change in planar position of the camera between capturing the selected frame and capturing the current frame.

3. The method of claim 2, wherein the transforming of the representation further comprises translating the location according to a motion equal and opposite to the component of the motion representing the change in planar position of the camera between capturing the selected frame and capturing the current frame.

4. The method of claim 1, wherein the transforming of the representation comprises:

translating a location of the representation of the foreground object in the selected foreground object image based on a component of the motion, the component of the motion representing a change in rotational position of the camera about a reference point between capturing the selected frame and capturing the current frame.

5. The method of claim 4, wherein the transforming of the representation further comprises translating the location according to a motion equal and opposite to the component of the motion representing the change in rotational position of the camera between capturing the selected frame and capturing the current frame.

6. The method of claim 1, wherein the transforming of the representation comprises:

scaling the representation of the foreground object in the selected foreground object image based on a component of the motion, the component of the motion representing a change in depth of the camera relative to a reference plane between capturing the selected frame and capturing the current frame.

7. The method of claim 6, wherein the transforming of the representation further comprises:

enlarging the representation of the foreground object in the selected foreground object image in response to the camera being closer to a position of the foreground object when the selected frame was captured; and reducing in size the representation of the foreground object in the selected foreground object image in response to the camera being further from the position of the foreground object when the selected frame was captured.

8. The method of claim 1, wherein the transforming of the representation comprises:

translating the representation of the foreground object in the selected foreground object image based on a component of the motion, the component of the motion representing a change in pointing orientation of the camera between the current frame and the selected frame.

9. The method of claim 8, wherein the transforming of the representation further comprises:

applying a lens distortion effect to the representation of the foreground object based on the component of the motion representing the change in pointing orientation of the camera between the current frame and the selected frame.

10. The method of claim 1, further comprising:

detecting an overlaid foreground object image exceeding an overlap threshold of at least one other overlaid foreground object image; and applying a partial transparency to the detected overlaid foreground object image exceeding the overlap threshold.

11. The method of claim 1, wherein the determining of the respective motion comprises:

identifying features in the selected frame corresponding to the respective selected foreground object image, and identifying corresponding features in the current frame;

performing a correlation to determine estimated motions between the identified features in the selected frame and the corresponding features in the current frame; and determining the respective motion of the camera based on the estimated motions between the identified features in the selected frame and the corresponding features in the current frame.

12. The method of claim 1, wherein the determining of the respective motion comprises:

obtaining motion sensor data from one or more motion sensors of the camera; and determining the respective motion of the camera based on the motion sensor data.

13. A non-transitory computer-readable storage medium storing instructions for generating a composite output video from an input video having a sequence of frames, the instructions when executed by a processor apparatus causing the processor to perform steps comprising:
- training a predictive model based at least on a plurality of input images;
- receiving a sequence of image frames depicting a foreground object, the sequence of image frames captured by a camera experiencing motion;
- for selected frames comprising a first quantity of frames in the sequence of image frames, (i) performing foreground/background segmentations to extract, based at least on the predictive model, a set of respective candidate foreground object images each comprising a representation of the foreground object with background pixels subtracted, wherein the performing of the foreground/background segmentations comprises selecting a foreground object image from the set of respective candidate foreground object images based on an image criterion associated with each of the respective candidate foreground object images, and (ii) storing the selected foreground object image to a foreground object list that comprises a plurality of foreground object images selected from respective sets of candidate foreground object images, where the predictive model is configured to be updated at least once for every second quantity of frames, the second quantity of frames being fewer than the first quantity of frames;
- determining, for each of the selected foreground object images in the foreground object list, a respective motion of the camera between a position of the camera when the selected frame corresponding to the respective selected foreground object image was captured and a position of the camera when a current frame corresponding to the respective selected foreground object image was captured;
- transforming the representations of foreground objects in the selected foreground object images based on the respective motions to generate transformed foreground object images; and
- overlaying the transformed foreground object images onto the current frame to generate a composite output image.

14. The non-transitory computer-readable storage medium of claim 13, wherein the transforming of the representation comprises:
- translating a location of the representation of the foreground object in the respective selected foreground object images based on a component of the motion representing a change in planar position of the camera between capturing the selected frame and capturing the current frame.

15. The non-transitory computer-readable storage medium of claim 14, wherein the transforming of the representation further comprises translating the location according to a motion equal and opposite to the component of the motion representing the change in planar position of the camera between capturing the selected frame and capturing the current frame.

16. The non-transitory computer-readable storage medium of claim 13, wherein the transforming of the representation comprises:
- translating a location of the representation of the foreground object in the selected foreground object image based on a component of the motion representing a change in rotational position of the camera about a reference point between capturing the selected frame and capturing the current frame.

17. The non-transitory computer-readable storage medium of claim 16, wherein the transforming of the representation further comprises translating the location according to a motion equal and opposite to the component of the motion representing the change in rotational position of the camera between capturing the selected frame and capturing the current frame.

18. The non-transitory computer-readable storage medium of claim 13, wherein the transforming of the representation comprises:
- scaling the representation of the foreground object in the selected foreground object image based on a component of the motion representing a change in depth of the camera relative to a reference plane between capturing the selected frame and capturing the current frame.

19. The non-transitory computer-readable storage medium of claim 18, wherein the transforming of the representation further comprises:
- enlarging the representation of the foreground object in the selected foreground object image in response to the camera being closer to a position of the foreground object when the selected frame was captured; and
- reducing in size the representation of the foreground object in the selected foreground object image in response to the camera being further from the position of the foreground object when the selected frame was captured.

20. The non-transitory computer-readable storage medium of claim 13, wherein the transforming of the representation comprises:
- translating the representation of the foreground object in the selected foreground object image based on a component of the motion representing a change in pointing orientation of the camera between the current frame and the selected frame.

21. The non-transitory computer-readable storage medium of claim 20, wherein the transforming of the representation further comprises:
- applying a lens distortion effect to the representation of the foreground object based on the component of the motion representing the change in pointing orientation of the camera between the current frame and the selected frame.

22. The non-transitory computer-readable storage medium of claim 13, wherein the instructions when executed by the processor apparatus further cause the processor to perform steps including:
- detecting an overlaid foreground object image exceeding an overlap threshold of at least one other overlaid foreground object image; and
- applying a partial transparency to the detected overlaid foreground object image exceeding the overlap threshold.

23. The non-transitory computer-readable storage medium of claim 13, wherein the determining of the respective motion of the camera comprises:
- identifying features in the selected frame corresponding to the respective selected foreground object image, and identifying corresponding features in the current frame;
- performing a correlation to determine estimated motions between the identified features in the selected frame and the corresponding features in the current frame; and determining the respective motion of the camera based on the estimated motions between the identified features in the selected frame and the corresponding features in the current frame.

24. The non-transitory computer-readable storage medium of claim 13, wherein the determining of the respective motion of the camera comprises:

obtaining motion sensor data from one or more motion sensors of the camera; and determining the respective motion of the camera based on the motion sensor data.

* * * * *